United States Patent
Cardinali

(10) Patent No.: US 8,349,914 B2
(45) Date of Patent: Jan. 8, 2013

(54) BIODEGRADABLE POLYMERS AND COMPOUNDS

(75) Inventor: Bruno Cardinali, Fermo (IT)

(73) Assignee: Technofilm S.p.A., Sant'Elpidio a Mare (IT)

( * ) Notice: Subject to any disclaimer, the term of this patent is extended or adjusted under 35 U.S.C. 154(b) by 0 days.

(21) Appl. No.: 13/066,085

(22) Filed: Apr. 6, 2011

(65) Prior Publication Data

US 2011/0257294 A1 Oct. 20, 2011

(30) Foreign Application Priority Data

Apr. 16, 2010 (IT) .............................. MC2010A0053

(51) Int. Cl.
*C08K 11/00* (2006.01)
*C08K 5/00* (2006.01)
*C08K 5/05* (2006.01)

(52) U.S. Cl. ........................................... 523/124; 524/9
(58) Field of Classification Search .................. 523/124; 524/9

See application file for complete search history.

(56) References Cited

U.S. PATENT DOCUMENTS

| 5,346,929 A | * | 9/1994 | Guttag ........................... 523/124 |
| 5,703,160 A | | 12/1997 | Dehennau et al. .......... 525/54.24 |
| 7,888,405 B2 | * | 2/2011 | Gohil et al. .................... 523/124 |
| 2009/0123767 A1 | * | 5/2009 | Gohil et al. .................... 428/458 |
| 2011/0129510 A1 | * | 6/2011 | Liebmann et al. ............. 424/401 |

FOREIGN PATENT DOCUMENTS

| EP | 0470691 A2 | 2/1992 |
| EP | 1 441 031 A1 | 7/2004 |
| EP | 1441031 A1 | 7/2004 |
| JP | 6-322216 A | 11/1994 |
| WO | 2007-125546 A1 | 11/2007 |
| WO | 2008-087675 A1 | 7/2008 |

OTHER PUBLICATIONS

European Search Report for EP 11 15 9529 dated Jun. 29, 2011.
European Search Report for EP 10 18 8829 dated Dec. 30, 2010.

* cited by examiner

*Primary Examiner* — Kriellion Sanders
(74) *Attorney, Agent, or Firm* — Lowe, Hauptman, Ham & Berner, LLP

(57) ABSTRACT

A method of biodegrading polymeric products is disclosed, which provides for addition of brewer's yeast or yeast mother or a mix of the two in the polymers or compounds that form said polymeric products.

18 Claims, No Drawings

BIODEGRADABLE POLYMERS AND COMPOUNDS

The present patent application for industrial invention relates to the field of thermoplastic polymers and polymer compounds with hydrocarbon chain with double-carbon bond (—C=C—) and/or single-carbon bond (—C—C—) and in particular it relates to a method of biodegrading products obtained with said thermoplastic polymers and compounds with hydrocarbon chain.

Amongst thermoplastic polymers with hydrocarbon chain, SBS (Styrene-Butadiene-Styrene), SIS (Styrene-Isoprene-Styrene), SIBS (Styrene-Isoprene, Butadiene-Styrene) block copolymers and relevant hydrogenated derivatives (SEBS, SEPS, etc.) are usually plasticized with paraffin mineral oils with low content of aromatic products.

Said block copolymers are suitably formulated with various additives, loads, reinforcing agents, pigments, etc. of organic or inorganic type and are subjected to a compounding process to form compounds that are used in many industrial sectors, such as shoes, car components, toys, seals, etc.

Being thermoplastic elastomeric materials, said compounds have considerable applicative advantages compared to vulcanized elastomers; therefore their use is constantly growing, reducing the market share of reticulated rubbers.

One of the problems, which is also common to vulcanized elastomeric products derived from basically olefinic monomers, consists in poor biodegradability. In fact, the main polymeric chains formed of carbon-carbon bonds (—C—C—) are hardly attacked by environmental microorganisms and the simultaneous presence of unsaturation in the same polymeric chain, such as double carbon-carbon bonds (—C=C—), does not basically change the biodegradative features of the polymer.

The addition of mineral oil, an indispensable plasticizer of the polyolefinic polymeric molecule in many cases, makes such a situation worse since its structure is basically composed of bonds (—C—C—) and the only unsaturation is exclusively of aromatic nature, and therefore very stable biologically.

The use of plasticizers, fillers or loads, with organic-based structures, such as oils extracted from a large variety of vegetal organisms: soy, corn, flax, etc. as well as starch and cellulose, contributes to solve the problems created by mineral plasticizers, that is to say the problem of human contact and biodegradability.

The international patent applications WO2008/087675 and WO2009/152870, in the name of the same applicant, perfectly describe the state of the art with regard to the aforementioned problems. In any case, the compounds described in the aforesaid two patent applications are not biodegradable according to ISO 14855 method, since the polymeric base, which qualifies the family of these products and gives them their essential chemical-physical characteristic, does not undergo noticeable biodegradation, such to achieve 90% in a determined period of time as required by the standards.

The European patent application No. 10188829.5, in the name of the same applicant, discloses an enzymatic process to biodegrade in a short time polymeric materials to which vegetal oils and organic loads, fillers of vegetal origin have been added. However, the precepts of the aforementioned patent application are effective only if polymers and their compounds do not contain considerable quantities of mineral oils. Unfortunately, the currently available commercial products contain high quantities of mineral oils, at 10-40% level, since the chemical-physical characteristics of these products are still at a higher level than the corresponding materials produced with vegetal oils. Hence, a problem originates to reduce the environmental contaminating level of these products that still have a great commercial importance.

EP 1 441 031 discloses a synthesis method for production of a special aliphatic linear polyester of alkyl-hydroxyl-carboxylic nature, synthesized with a specific gene inserted in yeast cells used to synthesize said polyester. Practically, it is a polymer similar to polyester of lactic acid or hydroxyl butyric acid and, as such, it is easily biodegradable.

U.S. Pat. No. 5,703,160 discloses a thermoformable biodegradable polyester composition obtained by combining three essential elements.

1—One starchy component of different extraction, composition and chemical modification.

2—One biodegradable polyester derived from lactic acid, hydroxyl butyric acid, hydroxyl propyonic acid, etc.

3—One salt of hydroxyl carbonyl acid, of sodium lactate type or similar salt.

As it is known, polyester does not comprise a hydrocarbon chain with double or single carbon bond that is difficult to biodegrade. Instead, polyester comprises polar groups that are more or less easily attacked by hydrolysis. Moreover, according to the monomers of the structure, biodegradable polyesters are produced also without the use of special additives. The products mentioned in the two aforementioned patents are a typical example. Therefore, the finished polyester product can be biodegradable also without the presence of yeast.

The purpose of the present invention is to eliminate the drawbacks of the prior art, by disclosing a method of biodegrading final products obtained with thermoplastic polymers and polymer compounds with hydrocarbon chain with double carbon bond C=C and/or single carbon bond C—C, modified with plasticizers of mineral type, such as paraffin mineral oils.

This purpose has been achieved according to the present invention, with the characteristics illustrated in the attached independent claim 1.

Advantageous embodiments are disclosed in the dependent claims.

The present invention discloses an innovative method of biodegrading thermoplastic polymeric products with hydrocarbon chain with double carbon bond C=C and single carbon bond C—C, plasticized with oils of mineral origin, also without organic additives, such as plasticizers and vegetal loads. In fact, the possible presence of vegetal products in the compounds of the present invention only accelerates the biodegradation process.

The method of the invention provides for addition of brewer's yeast or yeast mother or a mix of the two to the aforementioned polymeric products. So a final polymeric material-based product is obtained, containing yeast, that biodegrades the material in a reasonable period of time, as long as it is treated in suitable composting installations.

Yeast can be added to raw materials, before mixing and melting raw materials to obtain the compound, in such a way to obtain a yeast-containing product.

Alternatively, yeast can be added before the polymer compounding process, in such a way to obtain a yeast-containing compound. As it is known, compounds, generally in granules, undergo extrusion or molding process to obtain the final product. In such a case, yeast can be added during the extrusion or molding process in order to obtain a yeast-containing final product.

Brewer's yeast or yeast mother or a mix of the two is added to the compound in a concentration, in weight percentage, comprised between 0.5% and 10%, preferably from 1 to 4% with respect to the total weight of the compound. Elastomeric compounds, such as SBS (Styrene-Butadiene-Styrene Block Copolymers), or SEBS (SBS Block Copolymers, the unsaturated aliphatic chain of which is hydrogenated) or also polymeric products, such as SIS (Styrene-Isoprene-Styrene Block Copolymers), including its hydrogenated homologues, all of them containing mineral oils in their formulations, can be biodegraded, according to ISO 14855 method, if brewer's yeast or yeast mother or a mix of the two is added in concentration from 1 to 4%.

Biodegradation time is very different according to the type of polymers, of the quantity of mineral oils and of the possible presence of vegetal products or their derivatives.

The possible presence of vegetal products and their derivatives in the compounds only affects the decomposition reaction speed and not the final biodegradation result, which is independent from it.

Hydrocarbon polymers with saturated carbonaceous structure require longer biodegradation time than polymers with unsaturated carbonaceous structure. The situation with polymers containing atoms other than carbon in their main structure is more complex, because the type of functional groups can have a more or less positive effect on the biodegradation speed.

In all cases a considerable attack to polymeric material has been always observed in typical conditions of composting installations. The quantity of brewer's yeast or yeast mother or a mix of the two, in the range from 1 to 4%, only marginally modifies the biodegradation time of the material.

Types of brewer's yeast or yeast mother from different production processes can be used. In any case, the yeasts used in the present invention are normal commercial brewer's yeast or yeasts mother, available in solid form, in general in powder with low humidity content.

Following are some examples of biodegradable compounds according to the invention.

| EXAMPLE 1 (COMPOUND- EL1/35/000) | Kg |
|---|---|
| SBS SOL T 161 type | 100 |
| Paraffin mineral oil | 80 |
| Brewer's yeast | 2.0 |
| Features | |
| Shore A | 35 |
| MI (190°/5/Kg) | 15 |
| Tensile Strength at Break (Mpa) | 5.5 |
| Elongation (%) | 750 |
| Abrasion (mm3) | 380 |
| Biodegradation according to ISO 14855 at 90% | 12 months |

| EXAMPLE 2 (COMPOUND-EL2/65/000) | Kg |
|---|---|
| SBS SOL T 161 type | 100 |
| Paraffin mineral oil | 80 |
| Crystal PS | 30 |
| Yeast Mother | 2.0 |
| Features | |
| Shore A | 65 |
| MI | 50 |
| Tensile Strength at Break | 4.5 |
| Elongation | 500 |
| Abrasion 2 | 20 |
| Biodegradation according to ISO 14855 at 90% | 14 months |

| EXAMPLE 3 (COMPOUND- EL3/55) | Kg |
|---|---|
| SBS SOL T 172 | 8.5 |
| SBS SOL T 177 | 15.5 |
| SBS 501 REPSOL | 9.0 |
| Paraffin mineral oil | 5.5 |
| Calcium Carbonate | 1.5 |
| EVA (18/3) | 1.0 |
| Polystyrene | 2.5 |
| Brewer's yeast | 1.0 |
| Features | |
| Shore A | 55 |
| Tensile Strength at Break | 5.0 |
| Elongation | 700 |
| Abrasion | 180 |
| Biodegradation according to ISO 14855 at 90% | 15 months |

| EXAMPLE 4 (COMPOUND- EL4/70/000) | Kg |
|---|---|
| SBS SOL T 172 | 6.5 |
| SBS SOL T 177 | 10.0 |
| SBS 501 REPSOL | 6.0 |
| PolyButadiene RB 830 | 3.0 |
| Paraffin mineral oil | 6.5 |
| Calcium Carbonate | 2.0 |
| High Styrene SBS | 4.0 |
| Polystyrene | 2.5 |
| Yeast Mother | 0.5 |
| Brewer's yeast | 0.5 |
| Features | |
| Shore A | 70 |
| Tensile Strength at Break | 6.0 |
| Elongation | 500 |
| Abrasion | 190 |
| Biodegradation according to ISO 14855 at 90% | 17 months |

The invention claimed is:

1. A method of biodegrading a final product obtained from a thermoplastic polymer modified with a mineral oil plasticizer present in an amount greater than 10% by weight of the thermoplastic polymer and the mineral oil plasticizer, the method comprising the following steps:
    adding a brewer's yeast or a yeast mother or a mixture thereof to said thermoplastic polymer to obtain a final product containing the brewer's yeast or the yeast mother or the mixture thereof, and thereafter
    biodegrading said final product in a composting installation, and
    wherein said thermoplastic polymer is a Styrene-Butadiene-Styrene (SBS) block copolymer, or Styrene-Isoprene-Styrene (SIS) block copolymer, or Styrene-Butadiene, Isoprene-Styrene (SBIS) block copolymer.

2. The method as claimed in claim 1, wherein weight percentage concentration of said brewer's yeast or yeast mother or mixture thereof in the thermoplastic polymer ranges from 1 and 4% with respect to the total weight of the thermoplastic polymer.

3. The method as claimed in claim 1, wherein said block copolymer the intermediate blocks, Butadiene, Isoprene or mixture thereof are hydrogenated.

4. The method as claimed in claim 1, wherein said brewer's yeast or yeast mother or mixture thereof is added to the raw materials that form the thermoplastic polymer, before mixing and melting said raw materials, in such a way to obtain a product containing said brewer's yeast or yeast mother or mixture thereof.

5. The method as claimed in claim 1, wherein said brewer's yeast or yeast mother or mixture thereof is added to the raw materials that form the thermoplastic polymer before the polymerization process in such a way to obtain a composition that contains said brewer's yeast or yeast mother or mixture thereof.

6. The method as claimed in claim 1, wherein said brewer's yeast or yeast mother or mixture thereof is added to compounds that form the final polymeric product during extrusion or molding in such a way to obtain a final polymeric product containing said brewer's yeast or yeast mother or mixture thereof before molding.

7. The method as claimed in claim 3, wherein said block copolymer the intermediate blocks, Butadiene, Isoprene or mixture thereof are chosen from
  Styrene-Ethylene, Butylene-Styrene (SEBS) block copolymer,
  Styrene-Ethylene, Propylene-Styrene (SEPS) block copolymer, and
  Styrene-Ethylene, Ethylene, Propylene-Styrene (SEEPS) block copolymer.

8. The method as claimed in claim 1, wherein the mineral oil plasticizer is chosen from paraffin mineral oils.

9. The method of claim 8, wherein the final product further comprises vegetal products.

10. The method of claim 8, wherein the brewer's yeast or a yeast mother or a mixture thereof is present in an amount ranging from 0.5 to 10% relative to the weight of the thermoplastic polymer and the paraffin mineral oil plasticizer.

11. The method of claim 8, wherein the brewer's yeast or a yeast mother or a mixture thereof is present in an amount ranging from 1 to 4% relative to the weight of the thermoplastic polymer and the paraffin mineral oil plasticizer.

12. The method of claim 8, wherein the thermoplastic polymer and mineral oil plasticizer achieve biodegradation according to ISO 14855 ate 90%.

13. The method of claim 8, wherein the mineral oil plasticizer is present in an amount ranging from 10 to 40% by weight of the thermoplastic polymer and the mineral oil plasticizer.

14. The method of claim 1, wherein the final product further comprises vegetal products.

15. The method of claim 1, wherein the brewer's yeast or a yeast mother or a mixture thereof is present in an amount ranging from 0.5 to 10% relative to the weight of the thermoplastic polymer and the paraffin mineral oil plasticizer.

16. The method of claim 1, wherein the brewer's yeast or a yeast mother or a mixture thereof is present in an amount ranging from 1 to 4% relative to the weight of the thermoplastic polymer and the paraffin mineral oil plasticizer.

17. The method of claim 1, wherein the thermoplastic polymer and mineral oil plasticizer achieve biodegradation according to ISO 14855 ate 90%.

18. The method of claim 1, wherein the mineral oil plasticizer is present in an amount ranging from 10 to 40% by weight of the thermoplastic polymer and the mineral oil plasticizer.

* * * * *